Sept. 5, 1961 H. J. BIEDINGER ET AL 2,998,878
RIBBON SPOOL
Filed Sept. 9, 1960
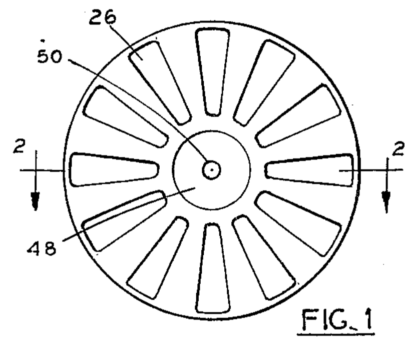
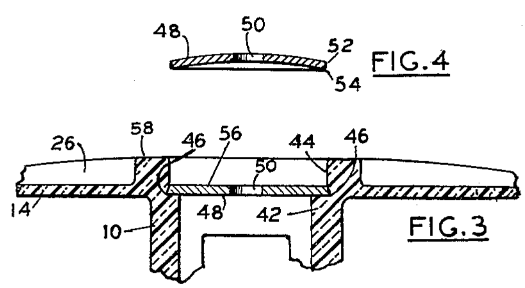
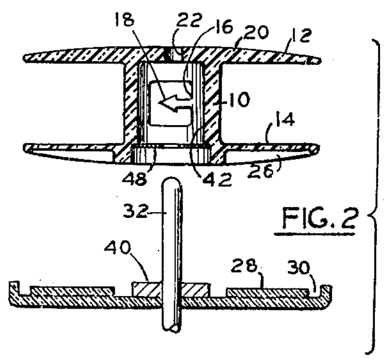
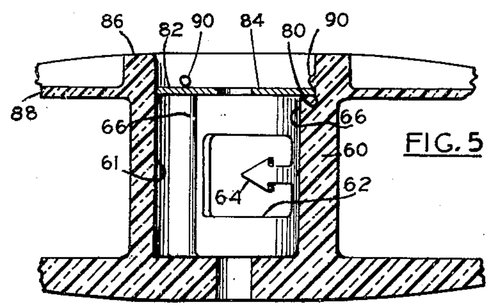
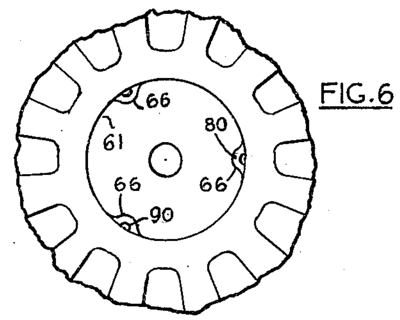
*INVENTORS*
HENRY J. BIEDINGER.
JOHN C. KUCKHOFF.
BY
ATTORNEY 2,998,878
RIBBON SPOOL
Henry J. Biedinger and John C. Kuckhoff, Syracuse, N.Y., assignors to The Syracuse Stamping Company, Inc., Syracuse, N.Y., a corporation of New York
Filed Sept. 9, 1960, Ser. No. 55,088
5 Claims. (Cl. 197—175)

This invention relates to typewriter ribbon spools and more particularly to an integral plastic spool having magnetic means for securing the spool in drive relation.

In ribbon spools for typewriters which rotate on a vertical axis, the easy replacement, and the facility for readily assuring correct replacement in regard to the spool driving mechanism are prime requirements. It has been the practice to provide plastic ribbon spools, one face of which is provided with a number of radially extending shallow recesses which are adapted to engage radially extending complemental raised portions on the supporting and driving carrier flange, such recesses and raised portions acting in the manner of a jaw clutch whereby the spool is driven by the supporting flange, to wind the typewriter ribbon upon the spool.

The thickness of the end flanges of such spools is such that the depth of the jaw clutch recesses and driving raised portions must be limited, and due the lightness of the spool itself, there is insufficinet weight to assure a drive, it being possible for the spool to lift slightly from the carrier flange, whereby slippage occurs. The present invention is directed to magnetic means for maintaining engagement between the recesses and raised portions forming the jaw clutch, the carrier spindle being provided with a shallow disc permanent magnet, and the spool being provided with a ferrous metal disc armature adapted to be held by the magnet, when the spool is in place, to prevent axial displacement thereof. The invention is further directed to a means for affixing a disc ferrous metal armature within the central opening of such a spool, that is economical to manufacture, and which provides a reliable hold down to retain clutch engagement when employed in conjunction with a thin permanent magnet affixed to the carrier. Such magnetic attraction however does not prevent the easy removal of the spool for replacement.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 1 is a bottom plan view of a spool showing the jaw clutch elements and magnet armature.

FIGURE 2 is an enlarged composite sectional view through the spool taken on the line 2—2 of FIGURE 1, with the driving carrier also shown in section spaced to receive the spool.

FIGURE 3 is an enlarged fragmentary sectional view taken on the line 2—2 of FIGURE 1, the spool being inverted.

FIGURE 4 is an enlarged sectional view of a ferrous metal disc or armature insert ready for application to the spool when inverted.

FIGURE 5 is an enlarged inverted sectional view of a spool illustrating a modified form of the invention, and FIGURE 6 is a fragmentary bottom plan view of the spool of FIGURE 5, prior to application of a ferrous metal insert.

In FIGURES 1 and 2 there is shown a typewriter spool having a hollow drum portion 10, and upper and lower end flanges 12 and 14. The drum portion may have a circumferential window 16 into which there projects a circumferentially extending integral ribbon barb 18. The drum is closed at one end as at 20 to provide a smooth top, and is provided with a spindle aperture 22, adapted to be threaded upon the free end of the carrier flange spindle 32. The lower flange 14, has, on its under face, a series of radial recesses 26, which are adapted to be engaged by complemental raised portions 28 on the circular carrier flange 30. The spool as thus far described is adapted to be molded in one piece of plastic, in a single molding operation.

The spool is adapted, when in use, to be threaded upon the vertically extending spindle 32 of the typewriter spool carrier disc flange 30, the spool resting upon the flange 30, with the radial projections 28 interlocking with the spool flange recesses 26, to form a jaw clutch.

In order to maintain the relatively light spool with its recesses 26 interlocked with the projections 28 of the carrier flange, and prevent the spool from rising on the spindle with possible slippage between the clutch teeth formed by the carrier projections 28, and the spool recesses 26, the spindle is provided with a permanently magnetized disc 40 driven or otherwise axially affixed on the spindle 32.

The open end 42 of the underside of the spool is provided with a shallow annular offset 44 providing a shoulder 46.

A convex disc or insert of ferrous metal 48 (see FIGURE 4) having a central spindle aperture 50, is sheared and dished from sheet metal stock, to provide a substantially cylindrical edge 52, and is of an exterior diameter to closely fit within the offset 44. Such disc insert is seated with its sharp annular edge 54 upon the shoulder 46, following which the disc is deformed and pressed flat as shown in FIGURE 3, which results in expansion of the diameter of the edge 54, to cause the same to dig into the offset wall 44, and provide a permanent attachment of the metal disc within the annular offset of the spool hub. In fact the periphery of the disc, when flattened becomes somewhat conical, providing an annular acute angle edge that digs into the annular offset wall of the spool. The depth of the surface 56 of the disc, when flattened, below the surface 58 of the flanges 14, corresponds to the thickness of the magnetic disc 40, so that when the spool rests upon the carrier flange 30 the magnetic attraction of the disc 40, upon the disc insert 48, holds the spool in position with its recesses 26 interengaged with the projections 28 on the carrier flange, in jaw clutch relation.

In FIGURES 5 and 6 a modified form of the invention is shown. The hollow plastic spool drum 60 with its circumferential window 62 and ribbon barb 64 is provided with three or more internal ribs 66 extending along the internal wall 61 of the spool drum 60. Such ribs terminate abruptly as at 80 to form a seat for a flat ferrous metal disc 82, such that the flat disc surface 84 will be spaced within the hub from the surface 86 of the flange 88 a distance equal to the thickness of the disc magnet 40 of the carrier. In order to hold the disc 82 in place, seated upon the ends 80 of the ribs 66, shallow integral blisters 90 extending inwardly of the hub internal wall 61 may be provided. Such blisters may be two, or preferably three, or more in number and spaced from the ends 80 of the ribs 66, by the thickness of the disc. The disc diameter, will then be such as to form a press fit, being pressed into position beyond the blisters, to seat upon the ends 80 of the ribs 66. In pressing the disc in place, the blisters and the adjacent hub portions from which the blisters project may be resiliently distended outwardly while pressing the disc in place.

The metal disc, being of soft iron, or steel, so as to afford maximum attraction with the permanent magnet 40, is readily deformed from its disked shape as shown in FIGURE 4 to the flat form as shown in FIGURE 3, and because soft iron or steel is preferable for its magnetic qualities, the extent of the disked shape, or depth of the disc concavity, before deformation may be relatively great, to provide secure attachment within the spool offset. It will be seen that in either form of the invention, a single press operation is all that is required to complete the permanent attachment of the disc to the plastic spool. In either form of the invention, it will be seen that the plane of the disc when located in position lies within the plane of the flange 14 (or 33), so that the spool is capable of resisting fracture, when the disc is pressed into place.

While the invention has been illustrated in two closely related modifications, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A plastic typewriter ribbon spool having a drum portion, hollow from the under side and having integral spaced upper and lower flanges, the lower flange having a series of shallow radial jaw clutch recesses, and a disc insert of magnetic material rigidly secured within the hollow drum portion and lying substantially within the plane of the lower flange.

2. A plastic typewriter ribbon spool having a drum portion, hollow from the under side and having integral spaced upper and lower flanges, the lower flange having a series of shallow radial jaw clutch recesses, and a disc insert of magnetic material rigidly secured within the hollow drum portion, said disc having a peripheral edge exerting radially outward pressure within the hollow hub substantially in the plane of the lower flange.

3. A plastic typewriter ribbon spool having a drum portion and integral upper and lower flanges, a central annular recess of less diameter than said drum portion in the underside of said lower flange, and a disc of magnetic metal press fitted radially within said recess, and lying substantially in the plane of the lower flange.

4. A plastic typewriter ribbon spool having an integral one piece hollow drum with integral upper and lower flanges, said drum having cylindrical inner and outer surfaces, said inner surface having axially extending ribs circumferentially spaced and terminating in shoulders lying substantially in the plane of the lower flange, a circular disc of magnetic material seated on said shoulders, and blisters inwardly projecting from the inner surface adapted to lock said disc seated on said shoulders.

5. A plastic typewriter ribbon spool having an integral one piece hollow drum with integral upper and lower flanges, said drum having an annular recess with a cylindrical side wall and an annular shouldered planar bottom the latter lying substantially in the plane of the lower flange, and a circular disc of magnetic metal having a conical periphery and an acute annular sharp edge seated on said shouldered bottom with said sharp edge pressed into said cylindrical recess side wall.

References Cited in the file of this patent

UNITED STATES PATENTS

| | | |
|---|---|---|
| 945,035 | Goodhue | Jan. 4, 1910 |
| 1,672,167 | Mossberg | June 5, 1928 |
| 2,437,997 | Charlin | Mar. 16, 1948 |
| 2,967,601 | Landgraf et al. | Jan. 10, 1961 |